United States Patent Office 3,702,224
Patented Nov. 7, 1972

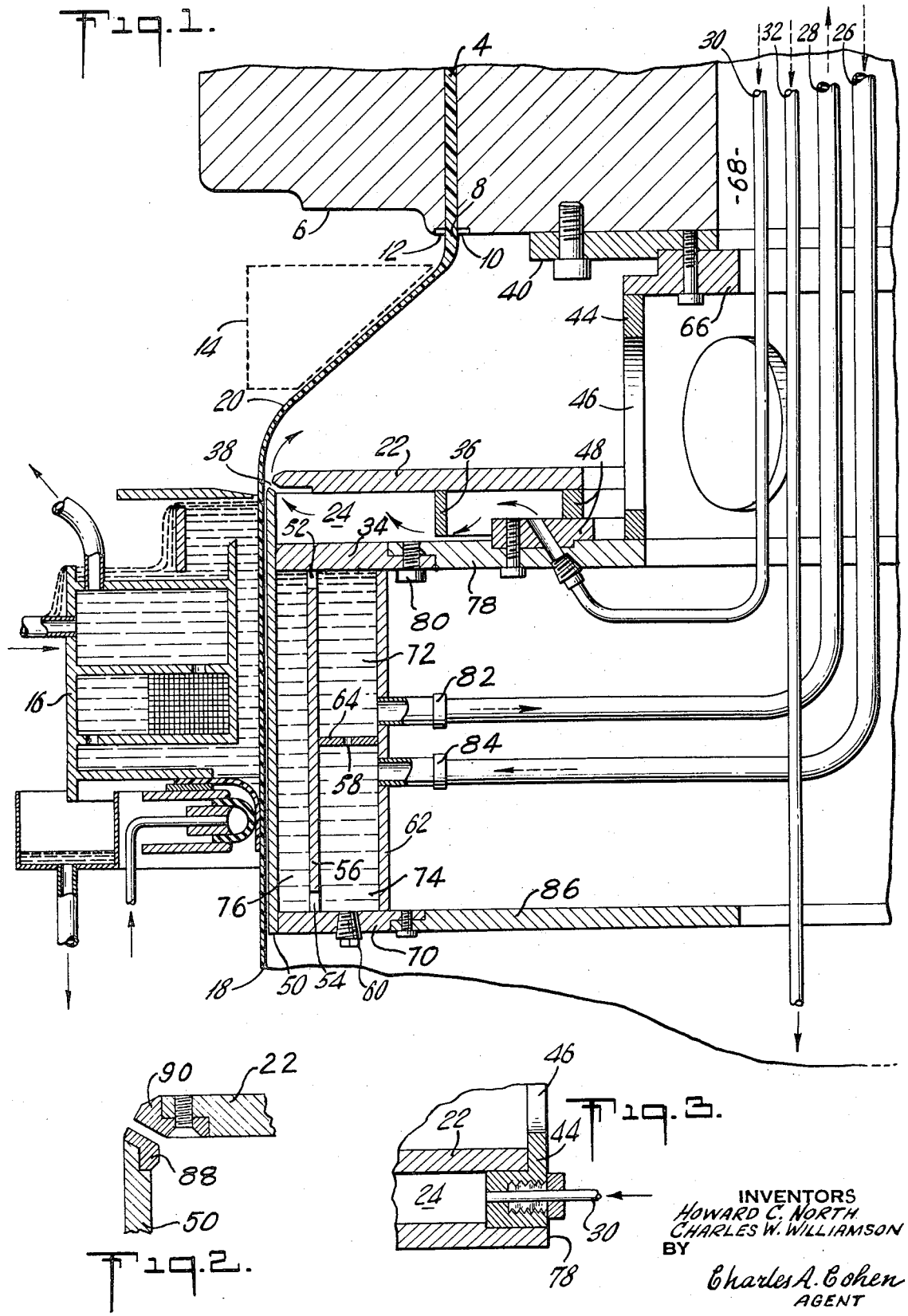

3,702,224
MANDREL FOR EXTRUDED THERMOPLASTIC FILM
Howard C. North, Baytown, and Charles W. Williamson, Seabrook, Tex., assignors to Esso Research and Engineering Company
Continuation-in-part of application Ser. No. 887,270, Dec. 22, 1969. This application Mar. 26, 1971, Ser. No. 128,338
Int. Cl. B29d 23/04
U.S. Cl. 425—71
10 Claims

ABSTRACT OF THE DISCLOSURE

In the extrusion of a thermoplastic resin through a ring-die in a generally downward direction to form a tubular film, wherein the film is partially cooled by means of a cooling gas before being drawn over a cooling and sizing mandrel, the improvement characterized by using a mandrel having a flattened top, an uncooled upper section, a cooled lower section, a tapered profile in longitudinal cross-section and an external surface texture within the limits of 50 to 1,000 microinches RMS.

CROSS-REFERENCE TO RELATED APPLICATIONS

This application is a continuation-in-part of Ser. No. 887,270 filed Dec. 22, 1969.

PRIOR ART

Mandrels of the type described in U.S. Pats. 3,400,184 and 3,450,806 are illustrative of the mandrels which have been known and used in the prior art for cooling and sizing tubular film extruded from a ring-die. These mandrels feature essentially a unitary construction consisting of a cylindrical shell cooled by internal circulation of a cooling medium, a circumferential slot located above the cylindrical shell for the passage of cooling air and a truncated conical or hemispherical portion, above the air slot, attached to and in communication with the cylindrical shell permitting the conical or hemispherical portion to be cooled by the same cooling medium used for cooling the shell.

Attempts to use the prior-art mandrels with simple external air-rings of the type designated as 29 in FIGS. 11 and 14 in U.S. Pat. 3,400,184 produced film of inferior quality.

DEVELOPMENT AND SUMMARY OF INVENTION

Analysis of the defects in the film made with prior-art mandrels indicated that they were formed by volatile components in the extruded resin, formed by or released during extrusion, condensing on the cooled conical or hemispherical portion of the mandrel which then dripped down to the cylindrical shell causing opaque blemishes and streaks with the resulting film being unsuitable for use as a commercially acceptable packaging material. Permitting the mandrel to operate at a temperature of 90° C. by limiting the circulation of the cooling medium had surprisingly little favorable effect.

The mandrel of the instant invention was developed to overcome these difficulties and differs from prior art mandrels in the following essential features:

(1) The conical or hemispherical top portions of the prior art mandrels have been eliminated and replaced with a flattened top.

(2) The cylindrical shell has been tapered within the limits of 0.1 to 5.0% of diameter for each foot of mandrel length with its maximum diameter at the top so as to accommodate the shrinkage in circumference as the film is cooled and drawn down.

(3) The tapered shell has been divided into an uncooled upper section and a lower section in which a cooling medium is circulated countercurrently to the direction in which the film is transported.

(4) The exterior surface of the tapered shell has been treated to impart to it a surface texture within the limits of 50 to 1,000 microinches RMS.

Elimination of the conical top portion of the prior art mandrels and removal of cooling from the top portion of the mandrel of this invention has permitted the mandrel to be moved closer to the die so that the top of mandrel may be heated by radiation from the die. By means of these changes condensation of volatiles from the extruded resin is virtually eliminated. The tapered construction of the shell and the unique surface texture imparted to it prevent sticking or grabbing of the film while at the same time assuring good contact for high heat transfer. The improvements in the mandrel enumerated above permit production of an unblemished clear film at high speeds.

DESCRIPTION OF DRAWING

Referring to FIG. 1 molten thermoplastic resin 4 from an extruder (not shown) is filtered through a screen (not shown) to remove impurities and is extruded through die-gap 8 defined by internal die-cap 10 and external die adjusting ring 12 in annular ring-die 6. The tubular film leaving die-gap 8 is expanded by a stream of air from exit slot 38 to form an upper film bubble 20 which is partially cooled, and constrained and directed toward the top edge of the mandrel by air applied externally to the upper film bubble from air-ring 14.

The film is drawn down over the external surface of mandrel shell 50 through water-bath 16 which cools the film below its solidification temperature and maintains the film in contact with the external surface of the mandrel shell by means of the hydrostatic head of the water. The finished film 18 leaving the bottom edge of the mandrel is maintained as a lower film bubble by air injected through line 32 until the film tube is flattened by nip-rolls and wound on take-up rolls.

In contrast to the unitary construction of prior art mandrels, the mandrels of the instant invention is distinguished by a sub-assembly construction which permits ready dismounting for maintenance, replacement or process changes. The mandrel assembly comprises a tapered shell 50 the upper end of which defines the lower lip of exit slot 38 for air. The top or cover plate 22 is a flattened disc or annulus the periphery of which defines the upper lip of exit slot 38.

The width and angle of exit slot 38 may be set as shown in FIG. 1, after use has demonstrated the optimum parameters or an alternate construction shown in FIG. 2 may be employed. FIG. 2 is a cross-section through the upper edge of shell 50 and the periphery of top 22 showing the application of lower ring 88 defining the lower lip of exit gap 38 and a matching upper ring 90 defining the upper lip of exit slot 38. By use of matched ring inserts the angle of exit slot 38 may be varied from zero degrees to 90 degrees as measured from the horizontal plane of the cover plate so as to provide optimum operation without the necessity of machining a new shell 50 or cover 22. Rings 88 and 90 may be made from the same or other metal composition comprising the shell or top or may be made from a heat-resistant non-metallic composition such as, for example, a polyfluoroethylene available commercially as Teflon or KEL-F.

Air for exit slot 38 is supplied through line 30 to plenum chamber 24 in which baffle plate 36, which may have a plurality of perforations or be of interwoven mesh construction, ensures good mixing of the air which exits from exit slot 38 at a temperature and pressure which is uniform about the circumferential periphery.

The periphery of outer plenum chamber seal-ring 34 which is attached to the inner wall of shell 50, as by welding, is bolted to inner plenum chamber seal-ring 78 which supports the mandrel cover plate 22 through mounting rings 48. The mandrel assembly is supported by and attached to the die 6 in fixed axial relationship through mounting tube 44, attached at its lower end to inner plenum chamber seal-ring 78 and at its upper end through centering-ring 66 and mounting plate 40. Mounting tube 44 is provided with a plurality of exit ports 46 for the air issuing from exit slot 38. Air passing through exit ports 46 is vented to the atmosphere or an exhaust system through central aperture 68 in die 6.

It will be apparent to those having skill in the mechanic arts that alternative means for mounting and supporting the mandrel can be devised. For example, mounting rings 48 may be integral with or bolted to the lower end of mounting tube 44, below exit ports 46, whereby attachment of the inner plenum chamber seal-ring 78 to the lower end of mounting tube 44 may be dispensed with. It will be seen that either arrangement permits ready dismounting of the shell 50 by removal of reinforcing plate 86 breaking of unions 82 and 84 and removal of bolts 80. FIG. 3 shows an alternate means for attaching cover plate 22 and upper seal plate 78 to mounting tube 44.

The exterior shell 50 of the mandrel is tapered, with its maximum diameter corresponding to the lower lip of exit slot 38, so as to accommodate the circumferential shrinkage in the film as it is pulled down over the mandrel. The degree of taper is a function of the coefficient of expansion of the resin, temperature of the upper film bubble, mandrel diameter, drawn-down speed, temperature of the coolant used in the water-bath and mandrel and final thickness of the film. For mandrels in the range of 5 to 50 inches in diameter and polyolefin resins, shell tapers in the range of 0.1 to 5.0% of the maximum diameter per foot of mandrel length have given satisfactory performance. For example, a mandrel having a maximum diameter of 30 inches at its upper end and a length of 12 inches may vary in diameter at its lower end between 29.97 inches (0.1%) and 28.5 inches (5.0%). In a typical embodiment detailed below, a mandrel was used having a maximum diameter of 46 inches at its upper end, a length of 12 inches and a diameter of 45 inches at its lower end. The taper was equal to 2.17%.

Shell 50 is cooled countercurrently to the direction of movement of the film by a cooling medium, such as chilled water, passing through an inner-wall 62 which is attached at its extremities to plenum seal plate 34 and bottom seal plate 70. Dividing the space between the tubular inner-wall 62 and shell 50 is vertical seal tube 56 attached at its extremities to outer plenum seal plate 34 and bottom seal plate 70. Tubular outer wall 56 is provided with a plurality of inlet ports 54 disposed circumferentially about its base and a similar number of outlet ports 52 at its top. The space between tubular inner wall 62 and tubular wall 56 is divided by horizontal seal plate 64 creating an upper chamber 72 and lower chamber 74. A number of "weep holes" 58 permit the cooling medium to be drained from the mandrel assembly through drain plug 60 when the mandrel requires servicing or replacement.

In use, the cooling medium enters lower chamber 74 through line 26, proceeds in a downwardly direction into outer chamber 76 through openings 54 continues upwardly through openings 52 into upper chamber 72, thence downwardly, exiting the mandrel through line 28.

The surface texture of the outer wall of mandrel shell 50 is a highly significant factor in the successful production of film, free of blemishes, at high speed. Use of superfinished, lapped, or polished surface textures in the range of 0.5 to 20 microinches RMS. result in seizure of the film on the surface and variations in thickness. Shot peening with ¼ to ½ inch steel balls to produce an "orange peel" surface offers some improvement and has been used in the prior art. As a result of considerable experimentation we have found that optimum results are obtained with the use of a surface texture in the range of 50 to 1,000 microinches RMS. A more preferred range is 150 to 500 microinches RMS. Most preferred, is a surface texture in the range of 200 to 400 microinches RMS. Means for producing a preferred surface texture is given in detail in the example below.

DETAILED DESCRIPTION OF INVENTION

Commercial, plant size film equipment consisting of an extruder comprising a screw and automatic screen changer, die, air-ring assembly, external water-bath, water-cooled mandrel of the instant invention, nip rolls and takeup rolls were used for the following test run.

A rotatable melt-joint adapter connecting the extruder to the die permitted the die air-ring assembly, mandrel and water-bath which were connected to one another in fixed axial relationship to be slowly rotated in an oscillatory manner through an angle of 360° for the purpose of randomizing any variation in film thickness. A speed control on the oscillating equipment permitted the speed of rotation to be varied from about 4 to 80 inches per minute measured as lineal speed at the periphery of the mandrel.

A standard batch of crystalline polypropylene resin having an n-heptane insoluble content of 95±1%, a melt index of 6.5±0.5 and a density in the range of 0.902–0.905 was used for the following test.

The polypropylene resin was fed to the extruder at the rate of 700 pounds per hour and extruded through a 36 inch diameter die having a die-gap of 20 mils (0.020 inch) at a temperautre of 220±10° C. and a pressure of 5,000 p.s.i.g., using an arrangement of die, air ring, mandrel and water-bath illustrated in FIG. 1.

The extruded tube leaving the die at a lineal velocity of about 17 feet per minute was partially inflated by air at a pressure in the range of 0.05 to 0.5 inch of water issuing from exit-gap 38 at the top edge of the mandrel, which had a maximum diameter near its top of about 46 inches, tapering to about 45 inches in one foot to its bottom, and drawn down over the cooled mandrel through the water bath. A lower film bubble was maintained by air injected below the mandrel until the tube was flattened by pinch or nip rolls and wound on take-up rolls. The mandrel shell had a surface texture of 350$\mu$ inches RMS.

Air was fed at a pressure in the range of 0.05 to 5.0 inches of water to the air-ring assembly which was disposed between the die and mandrel. Under steady operating conditions shown below in Table I, draw-down speeds of 175 lineal feet per minute and a film gauge thickness of 1¼ mil (0.00125 inch) were readily obtained and yielded film having outstanding clarity and freedom from striations, fog or irregularity.

TABLE I

| | | |
|---|---|---|
| Air pressure to external air ring | in. $H_2O$ | 1.3 |
| Air pressure in upper film bubble | in. $H_2O$ | 0.25 |
| Air pressure in lower film bubble | in. $H_2O$ | 0.20 |
| Air temperature | °C | 20 |
| Distance mandrel to die | in | 5¾ |
| Length of mandrel | in | 12 |
| Temperature of water to mandrel | °C | 15 |
| Temperature of water from mandrel | °C | 20 |
| Temperature of water to water-bath | °C | 15 |
| Temperature of water from water-bath | °C | 18 |
| Oscillation speed (at periphery of mandrel) | in. per min | 28 |

In order to obtain film of the highest clarity, it is essential to maintain the film before quenching in the water-bath and cooling by contact with the mandrel at a temperature above the temperature at which complete solidification or crystallization occurs. Slow cooling by means of air alone, for example, in the region where the film is in the form of the upper film bubble will produce film characterized by extreme brittleness, high haze and opalescent zones. Rapid quenching such as occurs in the waterbath and on the mandrel yields film having the highest clarity.

The mandrel shell used in the above experimental run had a surface texture of 350 microinches RMS and was produced as follows:

The mandrel shell, fabricated from a mild carbon steel was machined, ground and polished to final dimensions with a surface texture of 20 microinches RMS or less. The surface was then blasted with steel blasting shot having a diameter in the range of 18 to 32 mils (0.018 to 0.032 inch) using a direct pressure sandblasting machine at a pressure of 60 p.s.i.g. The surface was then finished by hard chrome plating to a thickness of 1.0 mil (0.001 inch) at a current density of 2 amperes per square inch. A surface texture of 350 microinches RMS as determined by ASA Test Number B46.1–1962 using a microfinish comparator for short peened surfaces was obtained by the above means.

In addition to avoiding the condensation of volatile products from the resin, the flattened top and uncooled top section of the mandrel offers many advantages in operation. In the start-up of production the film issuing from the die does not solidify on contacting the warm surface of the instant mandrel as it does on the cold top of the prior art mandrels. Accordingly, the film is more readily stretched and expanded to fit the mandrel and pulled down to the nip rolls. Of equal significance is the fact that in continuous operation it is frequently necessary to change the screen between the screw and the die in order to maintain maximum throughput. Even with automatic screen changers of the type illustrated in U.S. Patent 2,838,084 there is a momentary major reduction of polymer flow, with the formation of an unstable upper film bubble which has a tendency to collapse. With the prior art mandrels it is necessary to restart the operation whereas with the mandrel of this invention the bubble recovers without interruption of the process.

Having fully and operably described our invention and improvements over the prior art we claim:

1. A mandrel for cooling and sizing a tubular film of thermoplastic resin extruded in a generally downward direction from an annular die in a die-body comprises:
   (a) a tubular shell, having an inner wall and an outer wall in coaxial relationship to said annular die, said shell having an upper end defining the lower lip of an air slot in proximal relationship to said annular die, and a lower end;
   (b) an upper seal ring, intermediate said upper and lower ends of said shell forming the base of an upper plenum chamber, attached to said inner wall of said shell;
   (c) tube mounting means including exit ports for cooling gas issuing from said air slot and having a lower end attached to said upper seal plate and an upper end attached to said die-body, whereby said shell is supported from said die-body through said upper seal ring in fixed radial relationship;
   (d) a flattened cover-plate having an outer circumference defining the upper lip of said air slot and an inner circumference attached to said upper seal ring, thereby forming said upper plenum chamber in communication with said air slot;
   (e) a bottom seal plate having its periphery attached to said inner wall of said tubular shell in proximity to said lower end of said shell;
   (f) a tubular outer wall, circumferentially disposed within said tubular shell, including inlet ports at its base and outlet ports at its top, is attached at its upper end to said upper seal ring and is attached at its lower end to said bottom seal plate, thereby forming an outer cooling chamber for the circulation of a cooling medium;
   (g) means for passing a cooling gas into said upper plenum chamber; and
   (h) means for circulating a cooling medium through said outer cooling chamber.

2. A mandrel according to claim 1 wherein said tubular shell has an external taper within the range of 0.1 to 5.0% of the maximum diameter of said tubular shell per foot of mandrel length.

3. A mandrel according to claim 1 wherein said lower lip of said air slot comprises a ring insert attached to the upper end of said tubular shell and said upper lip of said air slot comprises a matching ring insert attached to the periphery of said cover-plate, whereby the angle at which the air issues from said air slot may be readily varied at any angle between the horizontal to the vertical.

4. A mandrel according to claim 1 wherein said outer wall of said tubular shell has a surface texture within the limits of 50 to 1000 microinches RMS.

5. A mandrel according to claim 1 wherein said outer wall of said tubular shell has a surface texture within the limits of 150 to 500 microinches RMS.

6. A mandrel according to claim 1 wherein said outer wall of said tubular shell has a surface texture within the limits of 200 to 400 microinches RMS.

7. A mandrel according to claim 1 wherein said air slot is angled to emit air in a predominantly horizontal direction.

8. A mandrel according to claim 1 wherein said air slot is angled to emit air in a direction between zero degrees and ninety degrees as measured from the horizontal plane of said cover-plate.

9. A mandrel according to claim 1 wherein said cooling medium flows in said outer cooling chamber in a countercurrent direction to the direction in which said tubular film moves over the surface of said tubular shell.

10. A mandrel for cooling and sizing a tubular film of thermoplastic resin extruded in a generally downward direction from an annular die in a die-body comprises:
   (a) a tubular shell, having an inner well and an outer wall in coaxial relationship to said annular die, said shell having an upper end defining the lower lip of an air slot in proximal relationship to said annular die and a lower end, said outer wall having a taper within the range of 0.1 to 5.0% of the maximum diameter of said shell per foot of mandrel length, and said outer wall having a surface texture within the limits of 150 to 500 microinches RMS.;
   (b) an upper seal ring intermediate said upper and lower ends of said shell, having an outer circumference attached to said inner wall of said shell forming the base of an upper plenum chamber, and an inner circumference;
   (c) tube mounting means including exit ports for cooling gas issuing from said air slot and having a lower end attached to the inner circumference of said upper seal ring and an upper end attached to said die-body, whereby said shell is supported from said die-body through said upper seal ring in fixed radial relationship;

d) a flattened cover-plate having an outer circumference defining the upper lip of said air slot and an inner circumference attached to said mounting tube means below said exit ports, thereby forming said upper plenum chamber in communication with said air slot;

e) a bottom seal plate having its periphery attached to said inner wall of said tubular shell in proximity to said lower end of said shell;

f) a tubular outer wall circumferentially disposed within said tubular shell, including inlet ports at its base and outlet ports at its top, is attached at its upper end to said upper seal ring and at its lower end to said bottom seal plate, thereby forming an outer cooling chamber for the circulation, of a cooling medium;

g) means for passing a cooling gas into said upper plenum chamber; and h) means for circulating a cooling medium through said outer cooling chamber in a generally upward direction.

References Cited
UNITED STATES PATENTS

| | | | |
|---|---|---|---|
| 3,337,663 | 8/1967 | Taga | 425—71 X |
| 3,450,806 | 6/1969 | Matsuo et al. | 264—89 |
| 3,600,479 | 8/1971 | Yazawa et al. | 425—71 X |
| 3,622,657 | 11/1971 | North | 264—95 |

J. SPENCER OVERHOLSER, Primary Examiner

N. E. LEHRER, Assistant Examiner

U.S. Cl. X.R.

425—326, 378